(12) United States Patent
Lee et al.

(10) Patent No.: US 12,598,400 B2
(45) Date of Patent: Apr. 7, 2026

(54) LIGHT FIELD MICROSCOPE-BASED IMAGE ACQUISITION METHOD AND APPARATUS

(71) Applicant: ACCUNOSE CO., LTD., Gyeonggi-do (KR)

(72) Inventors: Won Il Lee, Gyeonggi-do (KR); Young Hyeon Park, Gyeonggi-do (KR)

(73) Assignee: Accunose Co., LTD., Gyeonggi-do (KR)

( * ) Notice: Subject to any disclaimer, the term of this patent is extended or adjusted under 35 U.S.C. 154(b) by 241 days.

(21) Appl. No.: 18/467,120

(22) Filed: Sep. 14, 2023

(65) Prior Publication Data

US 2024/0007761 A1      Jan. 4, 2024

Related U.S. Application Data

(63) Continuation of application No. PCT/KR2022/008335, filed on Jun. 14, 2022.

(30) Foreign Application Priority Data

Mar. 17, 2022   (KR) ........................ 10-2022-0033343
Jun. 2, 2022   (KR) ........................ 10-2022-0067667

(51) Int. Cl.
*H04N 23/957* (2023.01)
*G02B 21/00* (2006.01)
*G02B 21/36* (2006.01)

(52) U.S. Cl.
CPC ....... *H04N 23/957* (2023.01); *G02B 21/0044* (2013.01); *G02B 21/361* (2013.01)

(58) Field of Classification Search
CPC . H04N 23/957; G02B 21/0044; G02B 21/361
See application file for complete search history.

(56) References Cited

U.S. PATENT DOCUMENTS 12,014,511 B2 *   6/2024   Leitner ................ G02B 21/361
2014/0347628 A1   11/2014   Martinez Corral et al.
(Continued)

FOREIGN PATENT DOCUMENTS

EP         3065394     *   7/2016
JP       2009-192412 A       8/2009
(Continued)

OTHER PUBLICATIONS

International Search Report for corresponding International Application No. PCT/KR2022/008335 mailed Dec. 6, 2022.
(Continued)

*Primary Examiner* — James T Boylan
(74) *Attorney, Agent, or Firm* — Eschweiler & Potashnik, LLC; Harris Kim

(57) ABSTRACT

Light field microscope-based image acquisition apparatuses and methods are provided. The light field microscope-based image acquisition apparatus includes a lenslet synthesis processing unit configured to acquire a virtual lenslet image using a multi-lenslet image group; a sub-aperture image conversion unit configured to convert the virtual lenslet image generated in the lenslet synthesis processing unit into a sub-aperture image; and a 3D conversion unit configured to convert the sub-aperture image generated in the sub-aperture image conversion unit into a focal-stack image.

10 Claims, 11 Drawing Sheets

<u>100</u>

(56) References Cited

U.S. PATENT DOCUMENTS

2024/0007761 A1 *  1/2024  Lee ...................... G02B 21/361
2024/0430585 A1 *  12/2024  Zeitoun ................. H04N 23/55

FOREIGN PATENT DOCUMENTS

JP          2012-145747  A      8/2012
KR      10-2016-0124421  A     10/2016
KR        10-2253320  B      5/2021

OTHER PUBLICATIONS

R. Oldenbourg, "Polarized light field microscopy: an analytical method using a microlens array to simultaneously capture both conoscopic and orthoscopic views of birefringent objects", Journal of Microscopy, Aug. 28, 2008, vol. 231, pp. 415-432.

Sigrid A. Langhans, "Three-Dimensional in Vitro Cell Culture Models in Drug Discovery and Drug Repositioning" Frontiers in Pharamcology, Jan. 23, 2018, vol. 9, Article 6, doi: 10.3389/fphar.2018.00006.

Devarasetty et al., "Applications of bioengineered 3D tissue and tumor organoids in drug development and precision medicine: current and future", BioDrugs, Feb. 2018, 32(1):53-68. doi:10.1007s40259-017-0258-x.

Vulto et al., "Adoption of organ-on-chip platforms by the pharameutical industry", Nature Reviews/Drug Discovery, vol. 20, Dec. 2021, pp. 961-961.

* cited by examiner

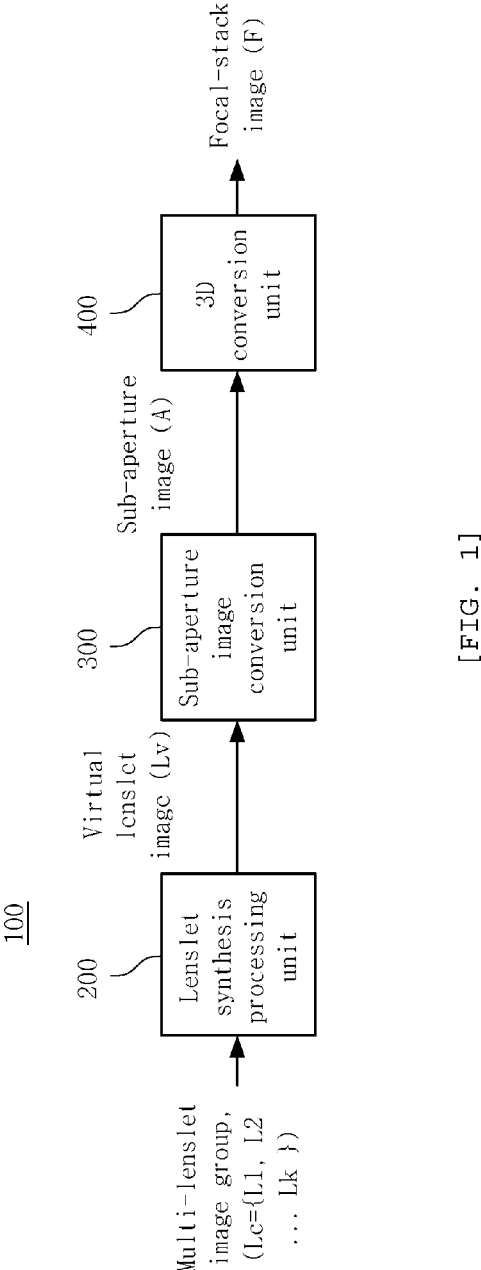
[FIG. 1]

[FIG. 2]
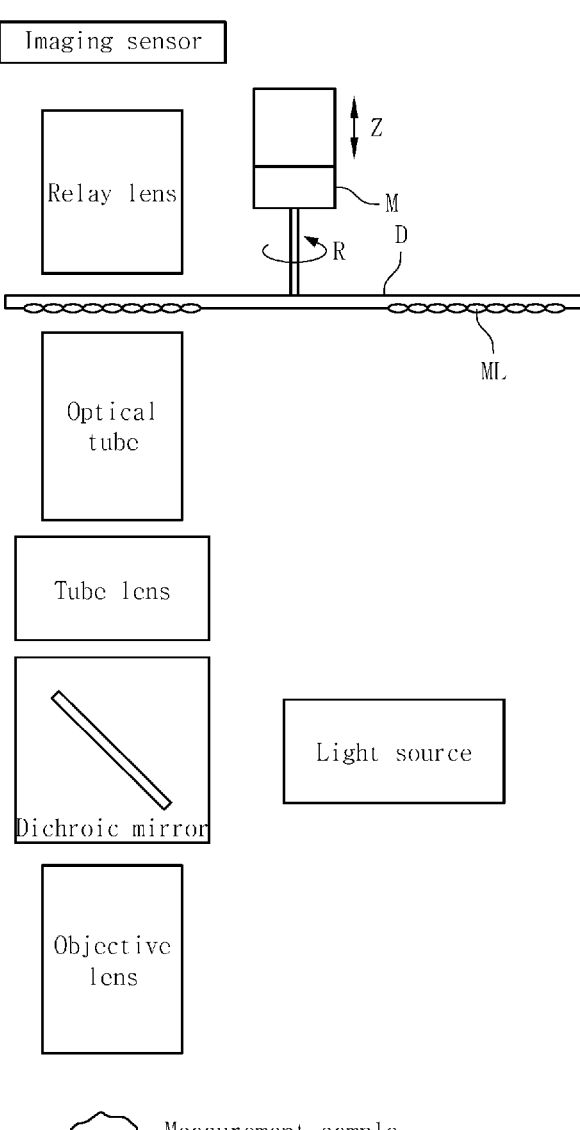

[FIG. 3]
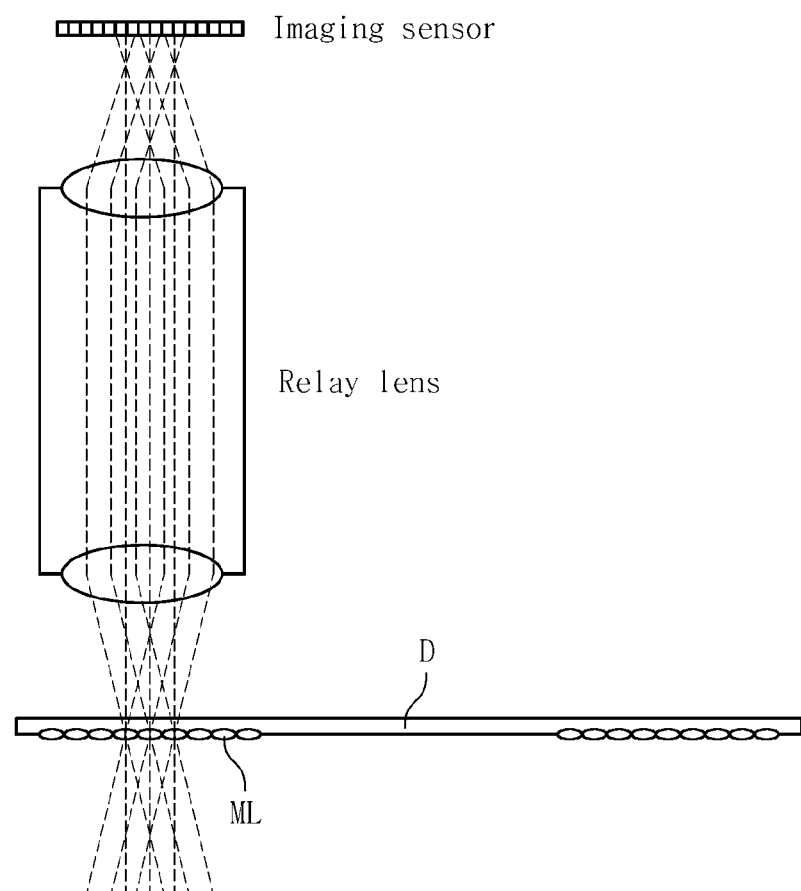

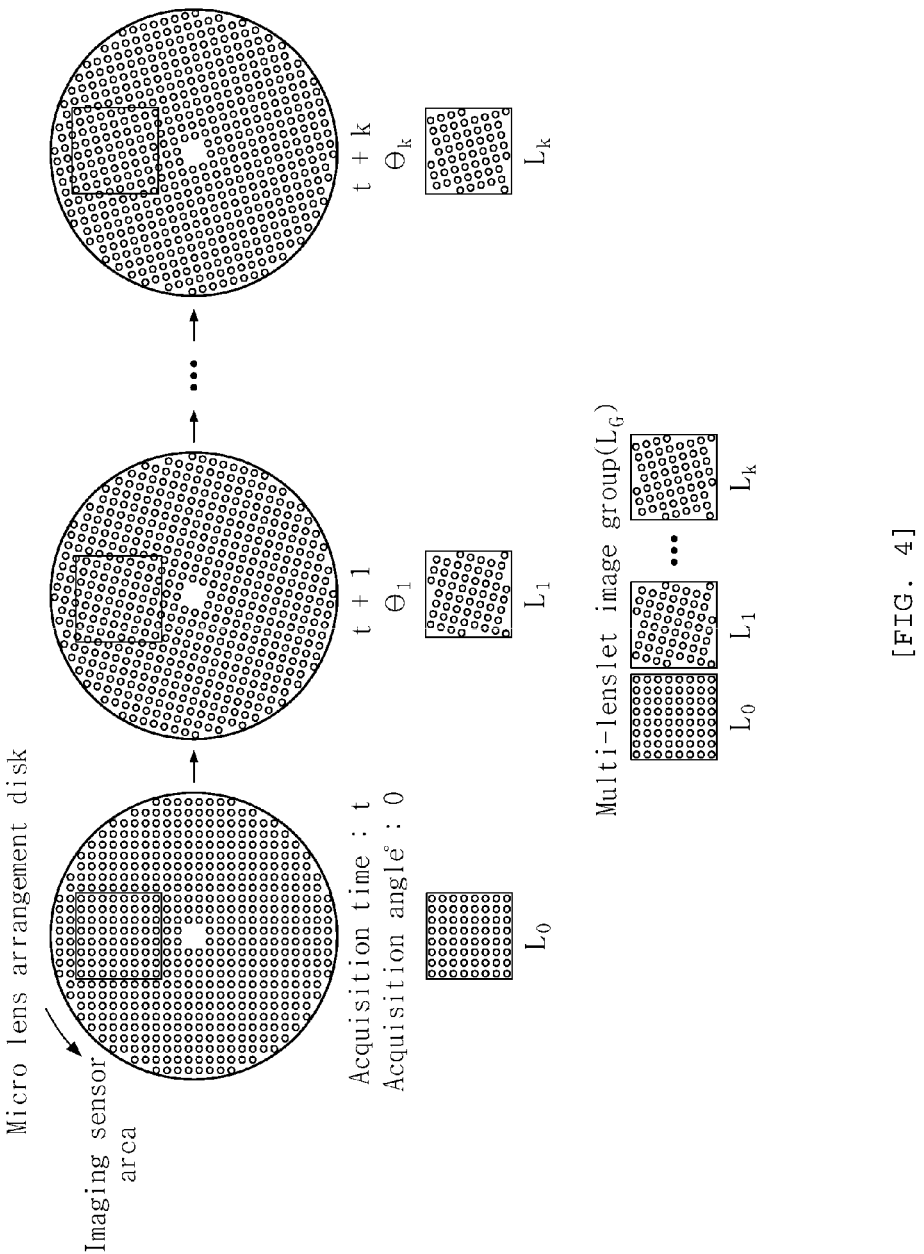
[FIG. 4]

[FIG. 5]
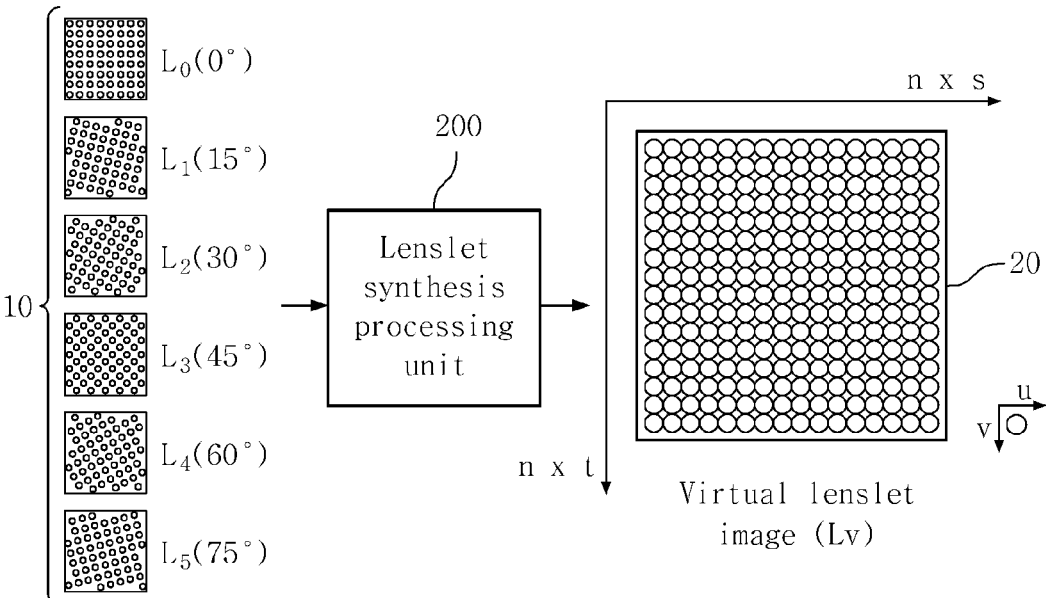
$L_0(0°)$
$L_1(15°)$
$L_2(30°)$
$L_3(45°)$
$L_4(60°)$
$L_5(75°)$
10
200
Lenslet synthesis processing unit
n x s
20
n x t
Virtual lenslet image (Lv)

[FIG. 6]
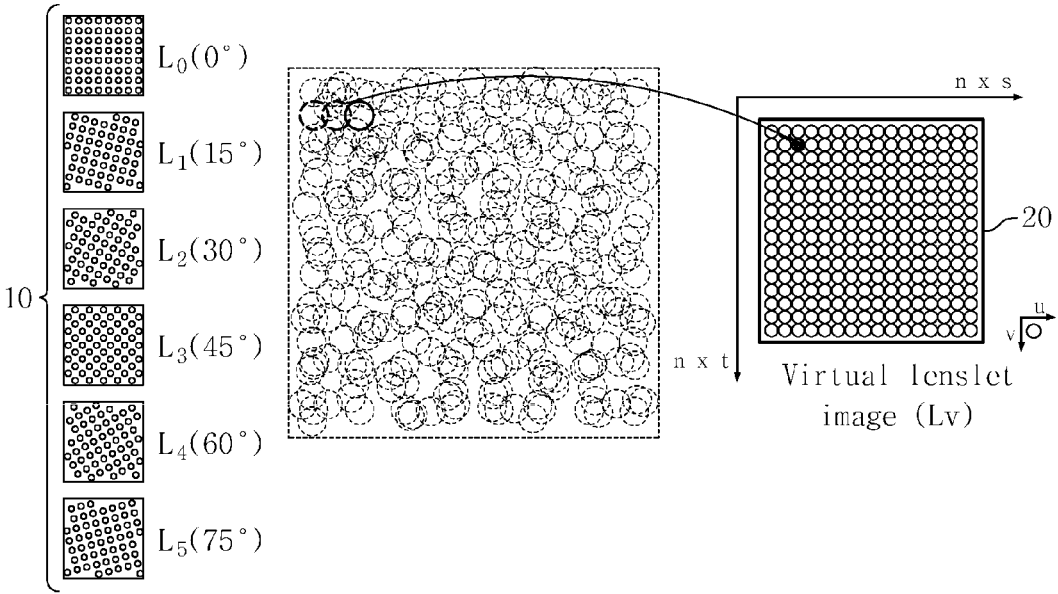

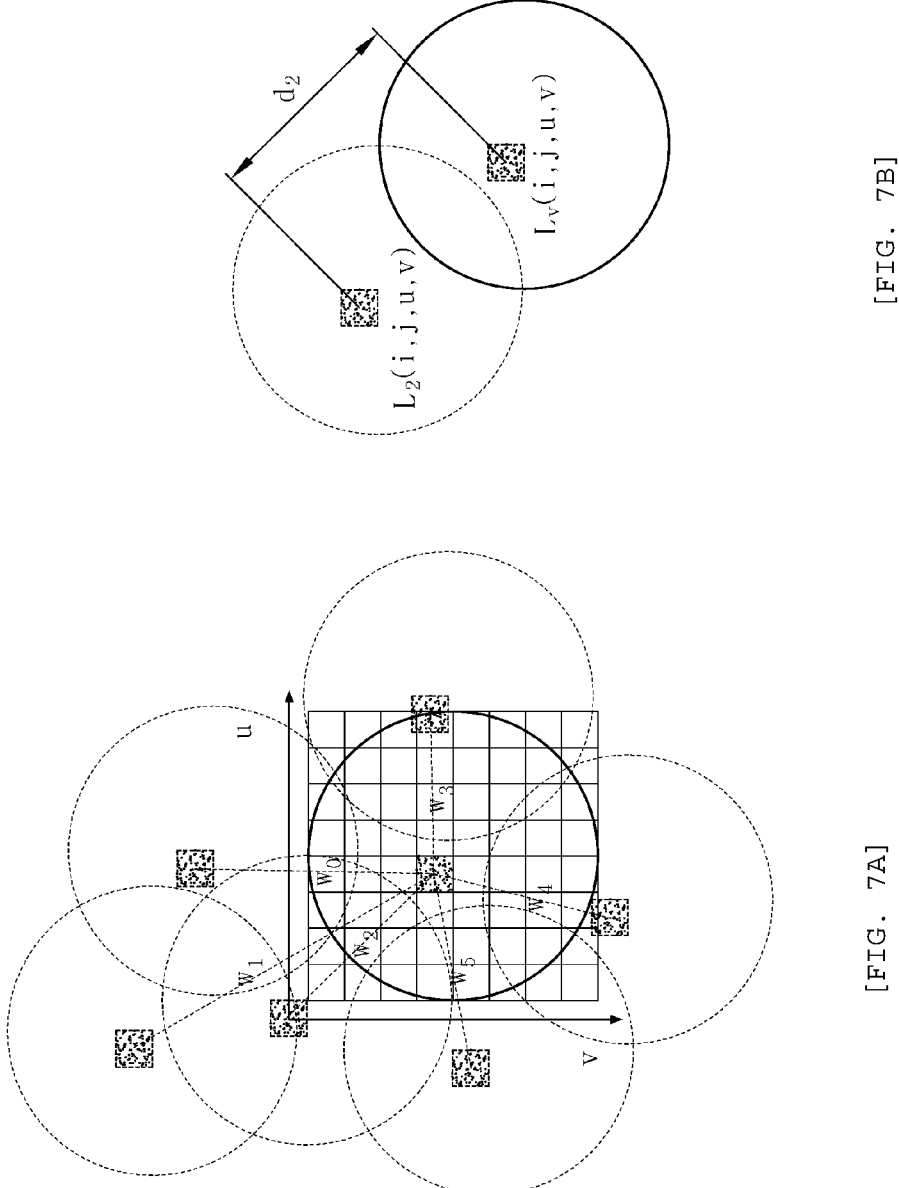
[FIG. 7B]
[FIG. 7A]

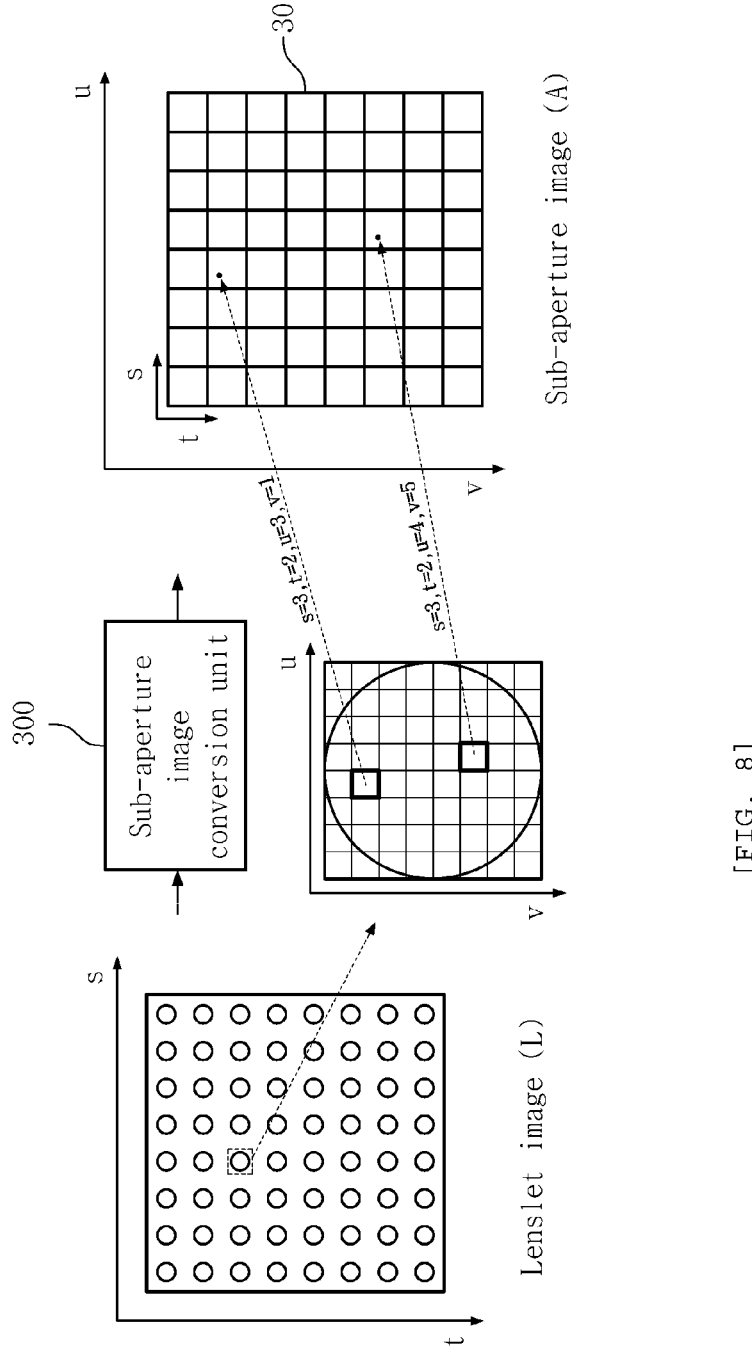
[FIG. 8]

[FIG. 9]
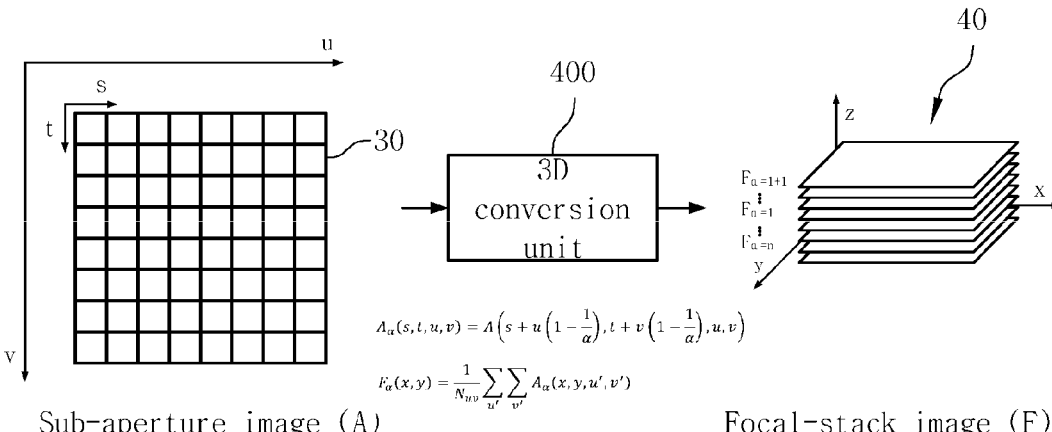
$$A_\alpha(s,t,u,v) = A\left(s+u\left(1-\frac{1}{\alpha}\right), t+v\left(1-\frac{1}{\alpha}\right), u, v\right)$$
$$F_\alpha(x,y) = \frac{1}{N_{uv}}\sum_{u'}\sum_{v'} A_\alpha(x,y,u',v')$$
Sub-aperture image (A)  Focal-stack image (F)

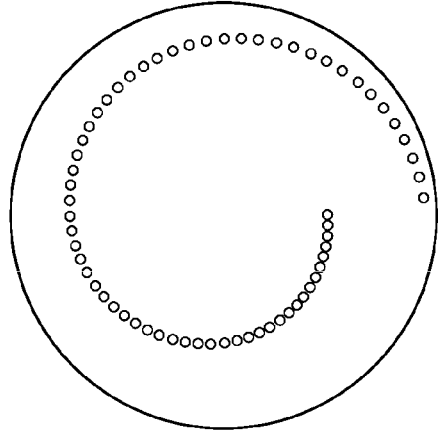
Nipkow disk pattern
[FIG. 10A]
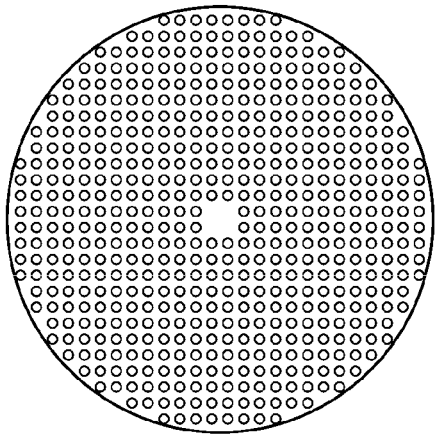
Grid disk pattern
[FIG. 10B]
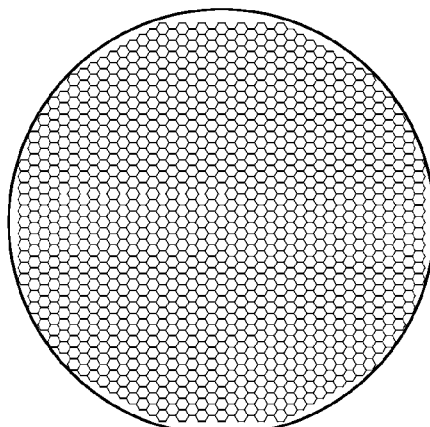
Honeycomb disk pattern
[FIG. 10C]
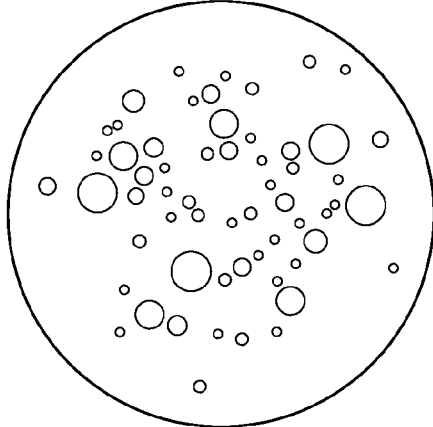
Random disk pattern
[FIG. 10D]

[FIG. 11]
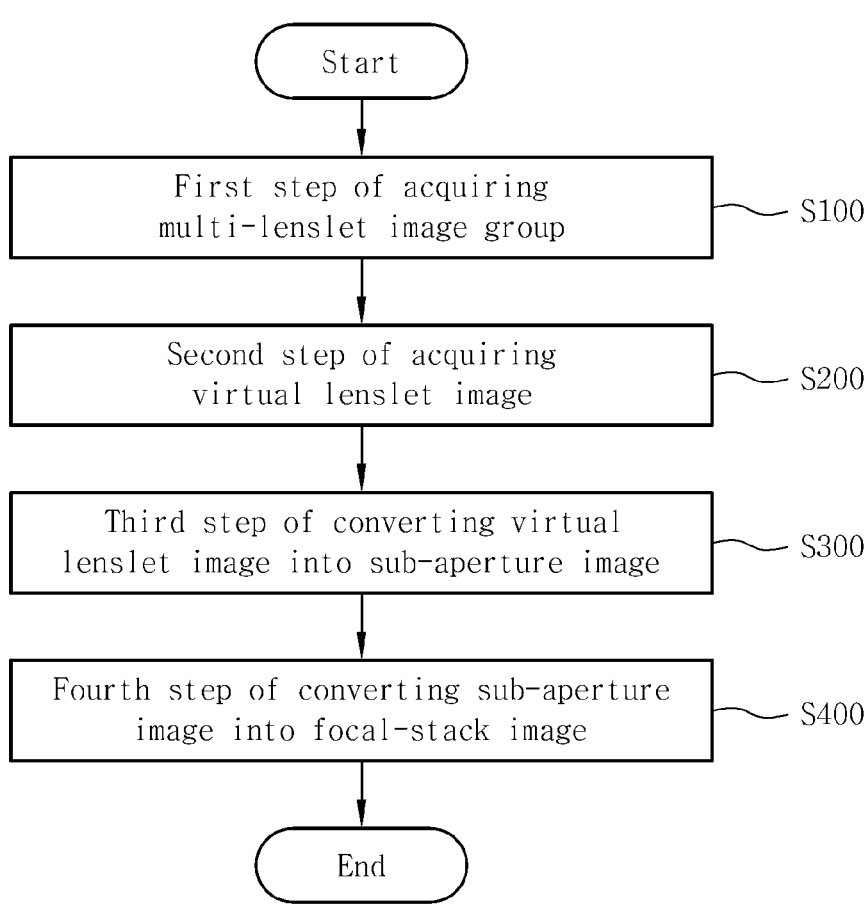

LIGHT FIELD MICROSCOPE-BASED IMAGE ACQUISITION METHOD AND APPARATUS

CROSS REFERENCE TO RELATED APPLICATION

This is a continuation of International Application No. PCT/KR2022/008335 filed on Jun. 14, 2022, which claims priority from Korean Patent Application No. 10-2022-0033343 filed on Mar. 17, 2022, and Korean Patent Application No. 10-2022-0067667 filed on Jun. 2, 2022. The contents of these applications are incorporated herein by reference in their entireties.

TECHNICAL FIELD

The present disclosure relates to light field microscope-based image acquisition methods and apparatuses capable of acquiring changes in a sample as a 3D image having a high spatial resolution.

BACKGROUND

Since a conventional fluorescence microscope captures a 2D plane image of a sample, in order to check the distribution of fluorescence in a 3D space, a method of capturing several slice images in a z-axis direction and synthesizing the slice images to reconstruct them into a 3D image is used.

That is to say, in conventional art, a 3D image is acquired by a way of combining images captured at respective depths by precisely adjusting a z-axis focal length.

However, since the above way captures images several times while changing a z-axis position, a distortion due to a change in fluorescence of the sample may occur during the time of image capturing. In the case of a cell cluster (muscle cells) in which movement occurs, it is difficult to check 3D information on the movement, and thus, it is very difficult to acquire an entire image in the same time frame.

A light field microscope has been devised to solve the above problems.

The light field microscope has an optical structure in which a lens array is added to the conventional fluorescence microscope structure, and it is possible to convert an image acquired from the corresponding optical structure into a 3D image through a reconstruction method.

However, although the conventional light field microscope has the advantage of being able to acquire 3D image information with just one capture, a disadvantage exists in that a spatial resolution is lower than that of conventional microscopes because the spatial resolution depends on the number of lenses in the lens array.

In other words, in the case of the light field microscope, there is a problem in that resolution is greatly reduced due to the gap between a plurality of lenses constituting the lens array.

Therefore, although a way of reducing the size of the lenses constituting the lens array has been proposed, there is a problem in that the pixel area of an image sensor should also be reduced correspondingly. For reference, because the pixel area of an image sensor affects the sensitivity of an image to be acquired, in order to be applied to a fluorescence imaging application that requires high sensitivity, it is important to keep the size of pixels large.

Therefore, the present applicant proposes the present disclosure in order to solve the above problems, and prior art documents related thereto include Korean Patent No.

10-2253320 entitled "Method for Displaying 3 Dimension Image in Integral Imaging Microscope System, and Integral Imaging Microscope System Implementing the Same".

BRIEF SUMMARY

The present disclosure is to solve the above problems, and an objective of the present disclosure is to provide a light field microscope-based image acquisition method and apparatus configured to be able to acquire an image having a high spatial resolution even without increasing the number of microlenses constituting a lens array by reducing the size of the microlenses.

In an embodiment, a light field microscope-based image acquisition apparatus may include: a lenslet synthesis processing unit configured to acquire a virtual lenslet image using a multi-lenslet image group; a sub-aperture image conversion unit configured to convert the virtual lenslet image generated in the lenslet synthesis processing unit into a sub-aperture image; and a 3D conversion unit configured to convert the sub-aperture image generated in the sub-aperture image conversion unit into a focal-stack image.

The multi-lenslet image group may be generated in such a way to acquire a plurality of image frame information through microlenses whose arrangement position is changed in each time frame within a set imaging sensor area.

The multi-lenslet image group may be acquired by rotating, for a set time, a disk on which a plurality of microlenses are arranged.

The lenslet synthesis processing unit may superimpose a plurality of image frames configuring the multi-lenslet image group to determine a disposition relationship of microlenses for each image.

The sub-aperture image conversion unit may find a pixel corresponding to the coordinates of a microlens in the virtual lenslet image, and may map the pixel to a coordinate position of the sub-aperture image to be converted.

The sub-aperture image conversion unit may generate a pixel value of the virtual lenslet image using $$L_v(i,j,u,v)=\Sigma_k w_k L_k(i,j,u,v) \qquad \text{Equation 1:}$$

where $$w_k = 1 - \frac{d_k}{\sum_k d_k},$$

$$\sum_k w_k = 1,$$

$L_v(i,j,u,v)$ is a pixel value corresponding to i, j, u and v coordinates, $w_k$ is a weight value according to a distance between a k-th lenslet image and the virtual lenslet image, and $d_k$ is a distance between the k-th lenslet image and the virtual lenslet image.

The 3D conversion unit may convert the sub-aperture image into the focal-stack image having 3D information of x, y and z axes, and an x-axis and y-axis position of the focal-stack image may include 2D image information at a corresponding z-axis coordinate point.

The 3D conversion unit may convert the sub-aperture image into the focal-stack image using $$A_\alpha(s,\ t,\ u,\ v) = A\left(s + u\left(1 - \frac{1}{\alpha}\right),\ t + v\left(1 - \frac{1}{\alpha}\right),\ u,\ v\right) \qquad \text{Equation 2}$$

-continued and $$F_\alpha(x, y) = \frac{1}{N_{uv}} \sum_{u'} \sum_{v'} A_\alpha(x, y, u', v'),$$  Equation 3 where $A_\alpha(s,t,u,v)$ is a converted sub-aperture value corresponding to s, t, u and v coordinates and a specific value of $\alpha$, $F_\alpha(x,y)$ is a focal-stack coordinate value corresponding to the value of $\alpha$, x, y are x and y coordinate values corresponding to a 3D focal-stack image, and $N_{uv}$ is the number of u and v coordinates.

The disk may be connected to an actuator or motor which provides rotational power or linear power.

A linear movement range of the disk may be 0 to 500 mm.

In an embodiment, a light field microscope-based image acquisition method may include: a first step of acquiring a multi-lenslet image group; a second step of acquiring a virtual lenslet image using the multi-lenslet image group acquired in the first step; a third step of converting the virtual lenslet image acquired in the second step into a sub-aperture image; and a fourth step of converting the sub-aperture image converted in the third step into a focal-stack image.

The light field microscope-based image acquisition method and apparatus according to the present disclosure provide a configuration capable of acquiring a multi-lenslet image group by way of rotating and linearly moving a disk on which microlenses are arranged and generating a 3D image using the multi-lenslet image group. Therefore, it is possible to acquire a 3D image having a higher spatial resolution than a conventional light field microscope.

In addition, the light field microscope-based image acquisition method and apparatus according to the present disclosure enable faster and more accurate acquisition of 3D image information of a measurement sample (muscle cells, etc.) in which movement occurs.

Also, the light field microscope-based image acquisition method and apparatus according to the present disclosure may acquire an image of a high spatial resolution by preventing a spatial resolution deterioration phenomenon due to the spacing of microlenses by changing the arrangement of microlenses by rotation of a disk.

Further, the light field microscope-based image acquisition method and apparatus according to the present disclosure may acquire an image of a high spatial resolution without increasing the number of arrangements in a disk or reducing the size of an image sensor by reducing the size of microlenses. Thus, the manufacturing cost of the apparatus may be reduced, and a cost required for image acquisition may be significantly reduced.

BRIEF DESCRIPTION OF DRAWINGS

FIG. 1 is a block diagram showing the configuration of a light field microscope-based image acquisition apparatus in accordance with an embodiment of the present disclosure.

FIG. 2 is a diagram schematically showing the configuration of a light field microscope to which the image acquisition apparatus in accordance with the embodiment of the present disclosure is applied.

FIG. 3 is a diagram showing the path of light passing through a disk in accordance with the embodiment of the present disclosure until the light reaches an imaging sensor.

FIG. 4 is a diagram showing a method of acquiring multiple images within a unit time by rotating, for the unit time, the disk on which a plurality of microlenses are arranged.

FIG. 5 is a diagram showing a state in which a multi-lenslet image group is converted into a virtual lenslet image by a lenslet synthesis processing unit.

FIG. 6 is a diagram showing in detail a process in which the multi-lenslet image group is converted into the virtual lenslet image.

FIGS. 7A to 7B are diagrams showing a method of generating a pixel value in the virtual lenslet image.

FIG. 8 is a diagram showing the processing procedure of a sub-aperture image conversion unit in accordance with the embodiment of the present disclosure.

FIG. 9 is a diagram showing the processing procedure of a 3D conversion unit which receives a sub-aperture image as an input.

FIGS. 10A to 10D are diagrams showing various arrangement patterns of microlenses which are defined on the disk.

FIG. 11 is a flowchart of a light field microscope-based image acquisition method in accordance with an embodiment of the present disclosure.

DETAILED DESCRIPTION

Advantages and features of the present disclosure and methods to achieve them will become apparent from the descriptions of embodiments herein below with reference to the accompanying drawings.

However, the present disclosure is not limited to the embodiments disclosed herein but may be implemented in various different ways. The embodiments are provided for making the present disclosure thorough and for fully conveying the scope of the present disclosure to those skilled in the art to which the present disclosure pertains. It is to be noted that the scope of the present disclosure is defined only by the claims.

Hereinafter, a light field microscope-based image acquisition method and apparatus according to embodiments of the present disclosure will be described in detail with reference to FIGS. 1 to 11. In describing the present disclosure, specific descriptions of related well-known functions or configurations are omitted in order not to obscure the subject matter of the present disclosure.

FIG. 1 is a block diagram showing the configuration of a light field microscope-based image acquisition apparatus in accordance with an embodiment of the present disclosure, FIG. 2 is a diagram schematically showing the configuration of a light field microscope to which the image acquisition apparatus in accordance with the embodiment of the present disclosure is applied, FIG. 3 is a diagram showing the path of light passing through a disk in accordance with the embodiment of the present disclosure until the light reaches an imaging sensor, FIG. 4 is a diagram showing a method of acquiring multiple images within a unit time by rotating, for the unit time, the disk on which a plurality of microlenses are arranged, FIG. 5 is a diagram showing a state in which a multi-lenslet image group is converted into a virtual lenslet image by a lenslet synthesis processing unit, FIG. 6 is a diagram showing in detail a process in which the multi-lenslet image group is converted into the virtual lenslet image, FIG. 7 is a diagram showing a method of generating a pixel value in the virtual lenslet image, FIG. 8 is a diagram showing a processing procedure of a sub-aperture image conversion unit in accordance with the embodiment of the present disclosure, FIG. 9 is a diagram showing a processing procedure of a 3D conversion unit which receives a sub-aperture image as an input, FIGS. 10A to 10D are diagrams showing various arrangement patterns of microlenses which are defined on the disk, and FIG. 11 is a flowchart of a light field microscope-based image acquisition method in accordance with an embodiment of the present disclosure.

As shown in FIGS. 1 and 2, the light field microscope-based image acquisition apparatus 100 according to the embodiment of the present disclosure may include a lenslet synthesis processing unit 200 which acquires a virtual lenslet image using a multi-lenslet image group 10; a sub-aperture image conversion unit 300 which converts the virtual lenslet image generated in the lenslet synthesis processing unit 200 into a sub-aperture image; and a 3D conversion unit 400 which converts the sub-aperture image generated in the sub-aperture image conversion unit 300 into a focal-stack image.

The light field microscope-based image acquisition apparatus 100 configured as described above may change the arrangement position of microlenses ML in each time frame in such a way to rotate or linearly move a disk D on which a plurality of microlenses ML are arranged, and may acquire the multi-lenslet image group 10 by acquiring a plurality of images according thereto.

For reference, FIG. 2 schematically shows a light field microscope to which the disk D according to the embodiment of the present disclosure is applied.

As shown in FIG. 2, when light of a specific wavelength that reacts to a phosphor is irradiated on a fluorescent-stained measurement sample through a light source, fluorescence light of the specific wavelength may be emitted from the measurement sample and may pass through an objective lens. Light having passed through the objective lens may pass through a dichroic mirror. In the dichroic mirror, the wavelength of the light source is reflected, and only a fluorescence wavelength is passed.

Fluorescent light having passed through the dichroic mirror reaches a focal plane through a tube lens and an optical tube, and the disk D according to the embodiment of the present disclosure is disposed on the corresponding focal plane.

The plurality of microlenses ML which are defined on the disk D serve to align light converging on the focal plane in conformity with the position of each lens. Light having passed through the microlenses ML passes through a relay lens. The relay lens serves to adjust the difference in physical distance between the arrangement of the microlenses ML and an imaging sensor. Light having passed through the relay lens reaches the imaging sensor, and an image is acquired through the imaging sensor. It is possible to reconstruct the path information of light acquired through the corresponding image into a 3D image through a software algorithm.

A portion of the area of the disk D may be disposed between the optical tube and the relay lens. In addition, the central portion of the disk D may be connected to a drive unit M which is composed of a known actuator or motor for transferring rotational power or linear power.

Accordingly, the disk D is capable of linear reciprocating motion in the direction of a Z-axis shown in FIG. 2, and moreover, is capable of rotational motion in an R direction shown in FIG. 2. For reference, it is preferred that the linear movement range of the disk D is 0 to 500 mm. Of course, the rotational speed and linear movement speed of the disk D may be set to various values depending on a measurement sample, a measurement way, and image information to be acquired.

Since the arrangement position of the microlenses ML is changed when the disk D is rotated, it is possible to acquire a different image at each time due to the changed arrangement position of the microlenses ML.

Accordingly, as shown in FIGS. 4 to 6, the multi-lenslet image group 10 may be acquired by rotating the disk D for a set time.

In summary, a plurality of image frame information is acquired through the microlenses ML whose arrangement position is changed in each time frame within a set imaging sensor area, and the multi-lenslet image group 10 may be acquired on the basis of the information. A way of changing the arrangement position of the microlenses ML may be implemented by a structure in which the disk D with the plurality of microlenses ML arranged thereon is rotated and is linearly moved for a set time.

FIG. 4 shows a method of acquiring multiple images within a unit time while rotating the disk D for the unit time.

As shown in FIG. 4, an image is acquired from the imaging sensor while rotating, in each time frame, the disk D on which the microlenses ML are arranged, and it may be checked that the arrangement position of the microlenses ML corresponding to each image is set differently.

As described above, by combining a plurality of image frame information acquired within a set time through the arrangement position of the microlenses ML that is changed in each time frame, it is possible to acquire the multi-lenslet image group 10.

For reference, FIG. 3 shows the path of light until the light passing through the microlenses ML reaches the imaging sensor. Light having passed through the tube lens is focused at a position where the microlenses ML are disposed, and light having passed through the microlenses ML passes through the relay lens while spreading again. Light having passed through the relay lens is focused again, and a digital image signal may be acquired by converting light information into the digital image signal through the imaging sensor at a position past a focal point.

FIG. 4 shows that the plurality of microlenses ML are arranged in a grid pattern on the disk D, but the present disclosure is not limited thereto.

For example, as shown in FIGS. 10A to 10D, the microlenses ML may be arranged on a disk in a Nipkow pattern, a honeycomb pattern or a random pattern.

The lenslet synthesis processing unit 200 may superimpose the plurality of image frames constituting the multi-lenslet image group 10 to determine the disposition relationship of the microlenses ML for each image.

As shown in FIG. 5, by using the multi-lenslet image group 10 constituted by multiple lenslet images acquired during the unit time, as an input image of the lenslet synthesis processing unit 200, a virtual lenslet image may be acquired. Although FIG. 5 shows that a virtual lenslet image is acquired by six lenslet images, the present disclosure is not limited thereto, and of course, the number of lenslet images may be adjusted.

The size of the virtual lenslet image to be outputted is linearly larger than the s and t resolution of the input image, and a magnification n is adjustable according to setting.

FIG. 6 shows in detail a procedure in which the multi-lenslet image group 10 is converted into the virtual lenslet image.

As shown in FIG. 6, the lenslet synthesis processing unit 200 may superimpose the plurality of image frames constituting the multi-lenslet image group 10 to determine the disposition relationship of the microlenses ML for each image frame. The virtual lenslet image is to dispose virtual microlenses ML within an image space, and the virtual microlenses ML may be superimposed in the image space.

These virtual microlenses ML may be arranged in a non-superimposed form in the virtual lenslet image according to the positional order thereof.

The sub-aperture image conversion unit 300 may convert the virtual lenslet image into a sub-aperture image.

The sub-aperture image conversion unit 300 may find a pixel corresponding to the coordinates of a microlens ML in the virtual lenslet image and map the pixel to a coordinate position of the sub-aperture image to be converted.

FIG. 8 shows the processing procedure of the sub-aperture image conversion unit 300.

As shown in FIG. 8, since a lenslet image includes information on light passing through the arrangement of microlenses ML, a circular image appears as the form of an arrangement. In conformity with the number of microlenses ML in the image, the horizontal and vertical positions of each microlens ML are represented by s and t coordinates, and the number of microlenses ML in the image may be expressed as the spatial resolution of a light field image. Each microlens ML has a predetermined number of pixel areas, and each pixel position in the microlens ML is expressed by the u and v coordinates of the corresponding microlens ML, and the number of the u and v coordinates is expressed as the angular resolution of the light field image.

Since the position of each pixel in the light field image conforms to the s, t, u and v coordinates, a procedure of converting a lenslet image into an aligned image is required, and the sub-aperture image conversion unit 300 performs the procedure of converting the lenslet image into a sub-aperture image. The performing procedure is to find a pixel corresponding to an s, t, u, and v coordinate position in each lenslet image and map the pixel to a position of an s, t, v, and u image of the sub-aperture image. The converted sub-aperture image is composed of u×v number of block images having a size of s×t, and each block image has angular information corresponding to u and v coordinates.

FIGS. 7A to 7B show, as an example, a method in which the sub-aperture image conversion unit 300 generates a pixel value in the virtual lenslet image.

As shown in FIGS. 7A to 7B, in a virtual lenslet image $L_G$, an arbitrary lenslet image corresponding to an i and j position has a pixel size of u and v. In order to generate the corresponding lenslet image, an adjacent lenslet image is acquired in the virtual lenslet image $L_G$, and a pixel value of the virtual lenslet image may be calculated through Equation 1 below.

$$L_v(i,j,u,v) = \Sigma_k w_k L_k(i,j,u,v) \qquad \text{Equation 1:}$$

Here, $$w_k = 1 - \frac{d_k}{\sum_k d_k},$$

and $\Sigma_k w_k = 1$. $L_v(i,j,u,v)$ is a pixel value corresponding to i, j, u and v coordinates, $w_k$ is a weight value according to the distance between a k-th lenslet image and the virtual lenslet image, and $d_k$ is the distance between the k-th lenslet image and the virtual lenslet image.

As described above, the 3D conversion unit 400 may convert the sub-aperture image generated in the sub-aperture image conversion unit 300 into a focal-stack image.

FIG. 9 shows the processing procedure of the 3D conversion unit 400 which receives the sub-aperture image as an input.

As shown in FIG. 9, the 3D conversion unit 400 may convert the sub-aperture image into a focal-stack image which has 3D information of the x-axis, the y-axis and the z-axis.

An x-axis and y-axis position of the focal-stack image includes 2D image information at a corresponding z-axis coordinate point, and the depth information of an image may be determined depending on the number of z-axis coordinates.

In a method in which the 3D conversion unit 400 converts the sub-aperture image into the focal-stack image, Equation 2 and Equation 3 below may be used.

$$A_\alpha(s, t, u, v) = A\left(s + u\left(1 - \frac{1}{\alpha}\right), t + v\left(1 - \frac{1}{\alpha}\right), u, v\right) \qquad \text{Equation 2}$$

$$F_\alpha(x, y) = \frac{1}{N_{uv}} \sum_{u'} \sum_{v'} A_\alpha(x, y, u', v') \qquad \text{Equation 3}$$

Here, $A_\alpha(s,t,u,v)$ is a converted sub-aperture value corresponding to s, t, u and v coordinates and a specific value of α. The converted sub-aperture value is necessary to acquire the focal-stack image, and a focal-stack coordinate value $F_{60}$ (x,y) corresponding to the value of a may be acquired. In addition, x, y are x and y coordinate values corresponding to the 3D focal-stack image. Furthermore, $N_{uv}$ is the number of u and v coordinates, and a specific z coordinate conforms to the specific value of α. A case where α=1 corresponds to the central position of the focal-stack image, and α has a range of 0<α<1+i. By adjusting the range of α, it is possible to adjust the measurement range of the z-axis.

Hereinafter, with reference to FIG. 11, a light field microscope-based image acquisition method according to an embodiment of the present disclosure will be described.

As shown in FIG. 11, the light field microscope-based image acquisition method according to the embodiment of the present disclosure may include a first step S100 of acquiring a multi-lenslet image group;

a second step S200 of acquiring a virtual lenslet image using the multi-lenslet image group acquired in the first step S100; a third step S300 of converting the virtual lenslet image acquired in the second step S200 into a sub-aperture image; and a fourth step S400 of converting the sub-aperture image converted in the third step S300 into a focal-stack image.

In the first step S100, a plurality of image frame information may be acquired through the microlenses ML whose arrangement position is changed in each time frame within a set imaging sensor area, and the multi-lenslet image group may be acquired in such a way of rotating, for a set time, the disk D on which the plurality of microlenses ML are arranged.

In the second step S200, a plurality of image frames constituting the multi-lenslet image group may be superimposed to determine the disposition relationship of the microlenses ML for each image. The lenslet synthesis processing unit 200 may perform the second step S200.

In the third step S300, a pixel corresponding to the coordinates of the microlens ML in the virtual lenslet image may be found, and may be mapped to a coordinate position of the sub-aperture image to be converted. The sub-aperture image conversion unit 300 may perform the third step S300.

In the fourth step S400, the sub-aperture image is converted into the focal-stack image having 3D information of x, y and z axes, and an x-axis and y-axis position of the focal-stack image may include 2D image information at a corresponding z-axis coordinate point. The fourth step S400 may be performed by the 3D conversion unit 400.

The light field microscope-based image acquisition method according to the embodiment of the present disclosure generates a high-resolution 3D image on the basis of the configuration described above in the light field microscope-based image acquisition apparatus 100 according to the embodiment of the present disclosure. Therefore, the detailed description thereof will be omitted so as to avoid overlapped description.

While specific embodiments of the present disclosure have been described so far, various modifications are possible without departing from the scope of the present disclosure.

Therefore, the scope of the present disclosure should not be defined by being limited to the described embodiments, but should be defined by not only the appended claims but also equivalents thereto.

INDUSTRIAL APPLICABILITY

The present disclosure may be applied and sold in various industrial fields using safety equipment, component inspection, material inspection, measurement and analysis instruments.

The invention claimed is:

1. A light field microscope-based image acquisition apparatus comprising:

a lenslet synthesis processor unit configured to acquire a virtual lenslet image using a multi-lenslet image group received from microlenses;

a sub-aperture image conversion processor configured to convert the virtual lenslet image generated in the lenslet synthesis processing processor into a sub-aperture image; and a 3D conversion processor configured to convert the sub-aperture image generated in the sub-aperture image conversion processor into a focal-stack image.

2. The light field microscope-based image acquisition apparatus of claim 1, wherein the multi-lenslet image group is generated in such a way to acquire a plurality of image frame information through microlenses whose arrangement position is changed in each time frame within a set imaging sensor area.

3. The light field microscope-based image acquisition apparatus of claim 2, wherein the multi-lenslet image group is acquired by rotating, for a set time, a disk on which a plurality of microlenses are arranged.

4. The light field microscope-based image acquisition apparatus of claim 2, wherein the lenslet synthesis processor superimposes a plurality of image frames configuring the multi-lenslet image group to determine a disposition relationship of microlenses for each image.

5. The light field microscope-based image acquisition apparatus of claim 4, wherein the sub-aperture image conversion processor finds a pixel corresponding to coordinates of a microlens in the virtual lenslet image, and maps the pixel to a coordinate position of the sub-aperture image to be converted.

6. The light field microscope-based image acquisition apparatus of claim 5, wherein the sub-aperture image conversion processor generates a pixel value of the virtual lenslet image using $$L_v(i,j,u,v)=\Sigma_k w_k L_k(i,j,u,v) \qquad \text{Equation 1:}$$

where $$w_k = 1 - \frac{d_k}{\sum_k d_k},$$

$$\sum_k w_k = 1,$$

$L_v(i,j,u,v)$ is a pixel value corresponding to i, j, u and v coordinates, $w_k$ is a weight value according to a distance between a k-th lenslet image and the virtual lenslet image, and $d_k$ is a distance between the k-th lenslet image and the virtual lenslet image.

7. The light field microscope-based image acquisition apparatus of claim 5, wherein the 3D conversion processor converts the sub-aperture image into the focal-stack image having 3D information of x, y and z axes, and an x-axis and y-axis position of the focal-stack image includes 2D image information at a corresponding z-axis coordinate point.

8. The light field microscope-based image acquisition apparatus of claim 7, wherein the 3D conversion processor converts the sub-aperture image into the focal-stack image using $$A_\alpha(s,\ t,\ u,\ v) = A\left(s + u\left(1 - \frac{1}{\alpha}\right), \right. \qquad \text{Equation 2}$$

$$\left. t + v\left(1 - \frac{1}{\alpha}\right),\ u,\ v\right) \text{ and}$$

and $$F_\alpha(x,\ y) = \frac{1}{N_{uv}}\sum_{u'}\sum_{v'} A_\alpha(x,\ y,\ u',\ v'), \qquad \text{Equation 3}$$

where $A_\alpha(s.t,u,v)$ is a converted sub-aperture value corresponding to s, t, u and v coordinates and a specific value of $\alpha$, $F_\alpha(x,y)$ is a focal-stack coordinate value corresponding to the value of $\alpha$, x, y are x and y coordinate values corresponding to a 3D focal-stack image, and $N_{uv}$ is the number of u and v coordinates.

9. The light field microscope-based image acquisition apparatus of claim 3, wherein the disk is connected to an actuator or motor which provides rotational power or linear power.

10. The light field microscope-based image acquisition apparatus of claim 3, wherein a linear movement range of the disk is 0 to 500 mm.

\* \* \* \* \*